UNITED STATES PATENT OFFICE.

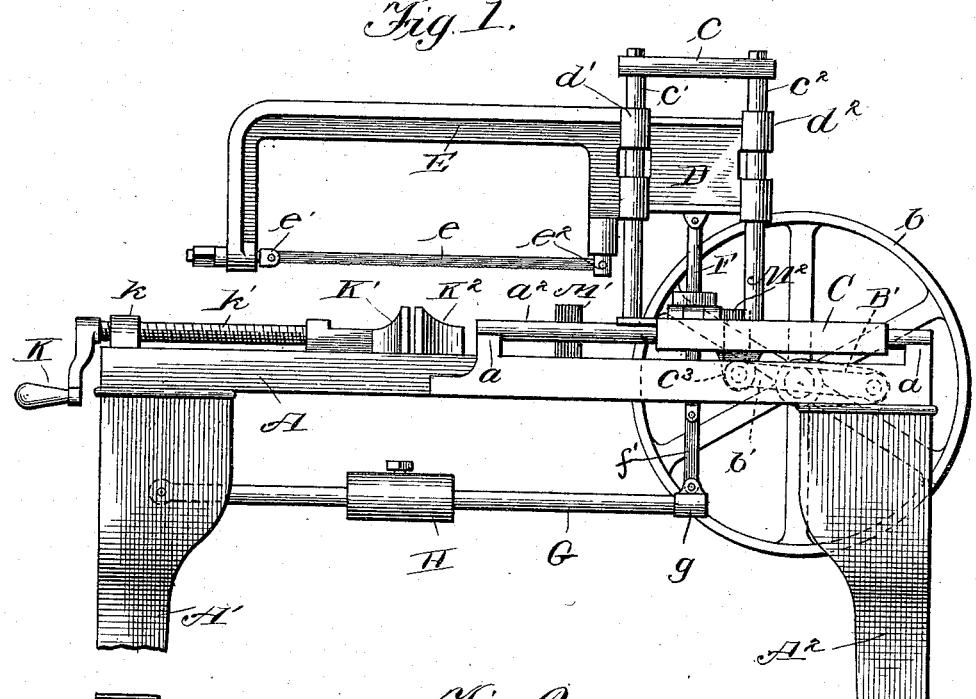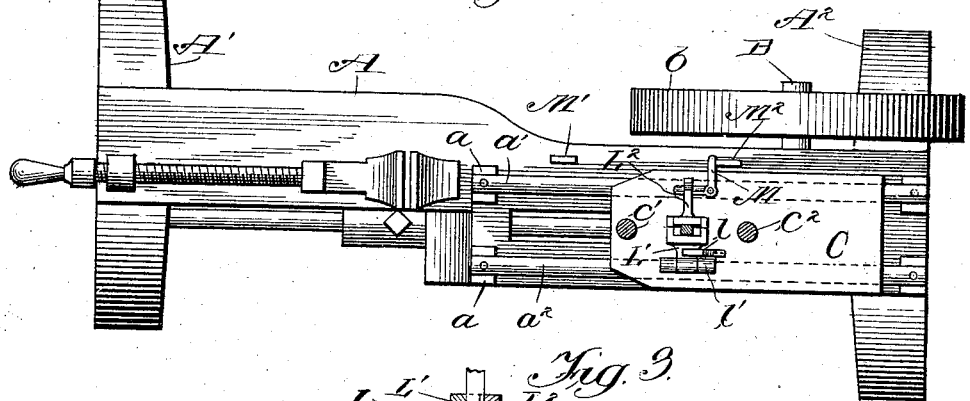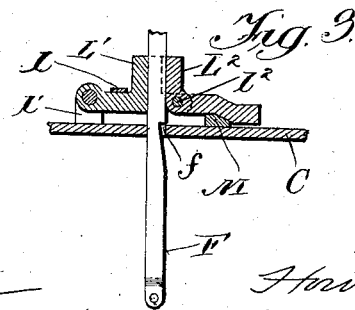

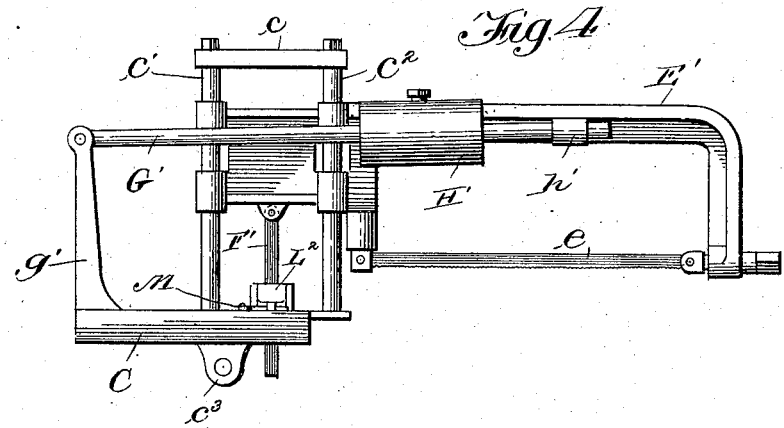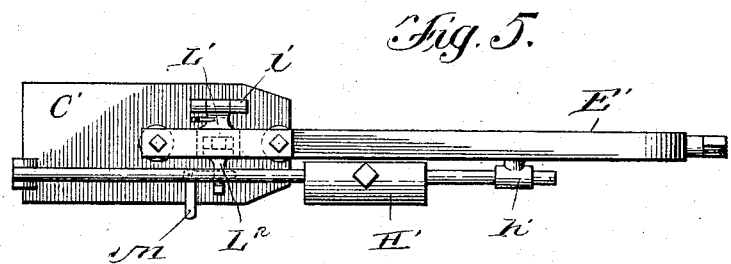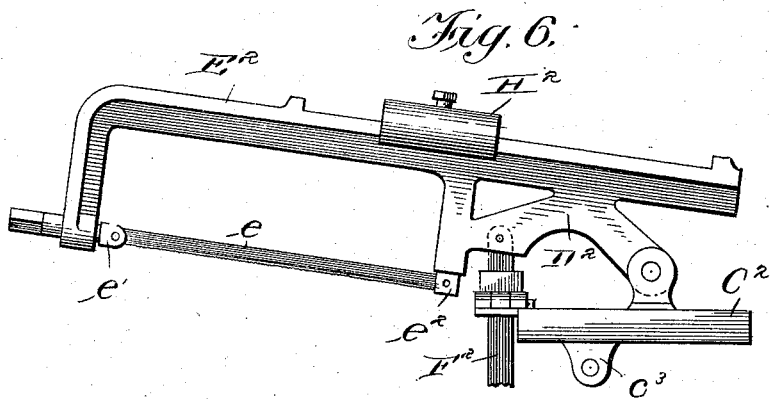

HOWARD W. COTTON, OF ROCHESTER, NEW YORK, ASSIGNOR, BY MESNE ASSIGNMENTS, TO QUINCY, MANCHESTER, SARGENT COMPANY, OF CHICAGO, ILLINOIS, A CORPORATION OF NEW JERSEY.

SAWING-MACHINE.

No. 867,643.

Specification of Letters Patent.

Patented Oct. 8, 1907.

Application filed August 25, 1902. Serial No. 120,910.

*To all whom it may concern:*

Be it known that I, HOWARD W. COTTON, a citizen of the United States, residing at Rochester, county of Monroe, State of New York, have invented a certain new and useful Improvement in Sawing-Machines, and declare the following to be a full, clear, and exact description of the same, such as will enable others skilled in the art to which it pertains to make and use the same, reference being had to the accompanying drawings, which form a part of this specification.

My invention relates in general to sawing machines, and more particularly to mechanism for controlling the position of the saw, with relation to the work.

Heretofore it has been customary to positively feed the saw at each reciprocation thereof, into the work, a pre-determined distance. This arrangement has proved unsatisfactory as the condition of the saw blade varies, as does also the resistance offered to the blade by the material, and consequently the depth of the cut into the material at each reciprocation of the saw, is not constant, which often results in injury to the blade, owing to its being fed faster than it can cut.

The object of my invention is to provide a sawing machine in which the blade will be automatically fed a distance corresponding to the depth of the cut made at each reciprocation of the blade.

A further object of my invention is to provide a sawing machine in which the saw blade is automatically lifted above the work after each cutting stroke, and held in such elevated position while being returned to position to commence another stroke, then automatically lowered into contact with the work.

A further object of my invention is to provide a sawing machine which will be simple in construction, inexpensive in manufacture and efficient in use.

My invention will be more fully described hereinafter with references to the accompanying drawings in which the same is illustrated as embodied in several convenient and practical forms in which:—

Figure 1 is an elevational view of one embodiment of my invention; Fig. 2, a plan view of the sawing machine shown in Fig. 1; Fig. 3, a detail view of the clutch; Fig. 4, an elevational view of a modified embodiment of my invention; Fig. 5, a plan view of the modification shown at Fig. 4, and Fig. 6, an elevational view of still another modified form of my invention.

Similar reference characters are used to indicate similar parts in the several figures of the drawings.

My invention, generally described, consists in a reciprocating saw blade provided with a weight for feeding the blade by gravity as it cuts into the work, a clutch for automatically gripping a rod depending from the saw frame and lifting the frame so that the blade is out of contact with the work during the return stroke of the blade, and means for releasing the clutch to permit the saw blade to descend into contact with the work, prior to the commencement of the forward cutting stroke.

Referring more particularly to Figs. 1, 2 and 3, reference letter A, indicates the supporting table provided at its opposite ends with pairs of legs $A^1$ and $A^2$. Mounted upon the table A, is a carriage C, which supports the saw frame. The carriage C is adapted to reciprocate above the table A, and any suitable form of guiding means may be interposed between the table and the carriage, such, for instance as guide rods, $a^1$ and $a^2$, supported at their opposite ends upon blocks $a$. The guide rods pass through openings formed longitudinally through the carriage.

Any suitable means may be provided for imparting a reciprocatory movement to the carriage C, such for instance, as a crank shaft B, journaled beneath the table A and provided with a crank $B^1$ which is connected by means of a link $b^1$ to the projection $c^3$ depending beneath the carriage. The belt wheel $b$, or any other means for communicating the rotary motion to the shaft B is keyed thereto.

A pair of upright posts $c^1$ and $c^2$ are fastened to the carriage C and are preferably provided with a connecting brace $c$ at their upper ends. The frame D which supports the saw frame, is guided between the post $c^1$ and $c^2$ by any suitable means, such for instance as eyes, $d^1$ and $d^2$, which surround the posts $c^1$ and $c^2$.

The saw blade $e$ is supported at its opposite ends in fittings $e^1$ and $e^2$ mounted in a frame E supported by the frame D.

The rod, F is secured to the lower surface of the frame D, and projects through an opening formed in the carriage C. The lower end of the rod F extends through a slot in the table A, and is pivotally secured to the link $f^1$. The other end of the link $f^1$ is pivotally secured to the coupling $g$, fitted around the end of the rod G, the other end of which is pivotally secured beneath the table A and preferably to one of the legs of the pair $A^1$. The weight H surrounds the rod G and is adjustable thereon.

A clutch is pivotally secured to the upper surface of the carriage C, and preferably consists of two members $L^1$ and $L^2$ between which the rod F extends. The member $L^1$ of the clutch is secured between lugs $l^1$ which project above the carriage C. The member $L^2$ of the clutch is pivotally secured between ears $l^2$ which project from the other member $L^1$ of the clutch.

A bell crank lever, M, is supported above the carriage C, and is provided with an inclined surface which engages a correspondingly inclined surface formed on member L² of the clutch. A leaf spring $l$ is rigidly secured to the carriage C, and engages the clutch member L¹ so as to force the same downwardly.

Obstructions M¹ and M² project above the table A into the path of one arm of the bell crank lever M to oscillate the same, and thereby operate the clutch to grip and release the rod F.

A pair of jaws, K¹ and K² are provided to hold the material in position to be engaged by the saw. The jaw, K² is rigidly secured on the table A while the jaw K¹ is adjustable towards and away from the stationary jaw by means of a screw threaded shaft $k^1$, which engages the screw threaded bearing $k$. A crank handle K is secured to the end of the shaft $k$ to rotate the same, and thereby adjust the position of the jaw K¹.

The operation of the embodiment of my invention, illustrated in Figs. 1, 2 and 3, is as follows:—The shaft B is rotated by means of a belt, or other power connection, thereby reciprocating the carriage C, through the link $b^1$ and crank arm B¹. A reciprocatory movement is consequently imparted to the saw frame and the material which is held between the jaws is cut by the saw blade. The weight H causes the saw frame to descend as the saw cuts into the work. When the carriage reaches the end of its stroke the bell crank lever M is swung about its pivot through contact with the obstruction M¹. The other arm of the bell crank lever, is thereby swung beneath the member L² of the clutch and by means of the inclined engaging surfaces of the bell crank lever and the member L² of the clutch, the latter is swung about its pivot, $l^2$ and grips the rod F between the two members of the clutch. The inclined surfaces of the bell crank lever also swing both members of the clutch upwardly about the pivotal connection between the clutch member L¹ and the lugs $l^1$, thereby lifting upwardly the rod F and with it the saw frame. The saw frame continues in such elevated position and the saw is thereby held out of contact with the work until the carriage reaches the limit of its stroke in the opposite direction, when the obstruction M² engages and swings the bell crank lever about its pivot, causing the same to move to the position shown in Fig. 3, thereby releasing the engagement between the members of the clutch and the rod F, so that the latter together with the saw carriage descends until the saw blade engages the work. A notch $f$ may, if desired, be provided in the rod F to engage the top of the member L² and retain the saw frame in an elevated position when the same is not in operation.

In the modification of my invention shown in Figs. 4 and 5 the weight H is supported upon and moves with the carriage, being located upon a rod G¹, one end of which is pivotally secured to the upper end of standard $g^1$, while the other end thereof loosely engages a sleeve $h^1$ swiveled to the saw frame E¹. The rod F¹ depends from the portion of the saw frame guided on the posts on the carriage and passes between the members of the clutch.

The operation of the specific form of my invention illustrated in Figs. 4 and 5 is in all respects the same as the operation of the embodiment thereof shown in Figs. 1, 2 and 3, except that the weight is mounted upon and moves with the carriage instead of being swung upon the rod beneath the table.

In Fig. 6 I have illustrated still another specific form of my invention, in which the weight H² is adjustably supported in direct engagement with the saw frame E². The saw frame is pivoted to the carriage C² and does not move bodily as do the saw frames in the other specific forms of my invention above described. The rod F² depends from the portion D² of the saw frame and passes between the two members of the clutch. The carriage C² is reciprocated in the same manner as is the carriage C shown in Figs. 1 and 2, namely, by means of a link secured at one end to the lug $c^3$ and at its other end to a crank shaft.

In each of the embodiments of my invention the weight may be adjusted so as to regulate the force with which the saw blade is forced into contact with the work.

From the foregoing description it will be observed that I have invented a sawing machine in which the saw blade is automatically fed into the work by gravity, thereby avoiding the objections which exist to the use of the positive feeding mechanisms for the saw blade.

It will also be observed that I have invented a sawing machine with means for automatically lifting the saw blade out of contact with the work after each cutting stroke and automatically lowering the saw blade into contact with the work prior to the commencement of each cutting stroke.

While I have described more or less precisely the details of construction, I do not wish to be understood as limiting myself thereto, as I contemplate changes in form, the proportion of parts and the substitution of equivalents, as circumstances may suggest or render expedient, without departing from the spirit of my invention.

1. In a sawing machine, the combination with a reciprocating carriage, of a vertically movable saw frame supported upon said carriage, a saw blade carried by said frame, a rod secured to said frame, a clutch mounted upon said carriage, and means for operating said clutch to grip said rod and for lifting the clutch, rod and frame upon the completion of each cutting stroke of the saw blade.

2. In a sawing machine, the combination with a reciprocating carriage, of a vertically movable saw frame, supported upon said carriage, a saw blade carried by said frame, a rod secured to said frame, a two part friction clutch surrounding said rod and pivotally secured to said carriage, a bell crank lever pivoted to said carriage and adapted when oscillated to close and clutch around said rod and lift the same, and means of oscillating said bell crank lever when said carriage reaches the limit of its stroke in each direction.

3. In a sawing machine, the combination with a table, of a reciprocating carriage mounted upon said table, a vertically movable saw frame supported upon said carriage, a saw blade carried by said frame, a rod secured to said frame, a two part friction clutch surrounding said rod and pivotally secured to said carriage, a bell crank lever pivoted to said carriage and adapted when oscillated to close and clutch around said rod and lift the same and obstructions projecting above said table into the path of movement of said bell crank lever for oscillating the latter and thereby actuating the clutch.

4. In a sawing machine, the combination with a table, of a reciprocating carriage mounted upon said table, a vertically movable saw frame supported upon said carriage, a saw blade carried by said frame, a depending rod pivotally secured to said frame, a clutch formed of two hinged portions surrounding said rod, one portion of said clutch being pivotally secured to said carriage, a finger projecting from the other portion of said clutch, a bell crank lever pivoted to said carriage and adapted when oscillated to close said clutch around said rod and thereby lift the same, an obstruction secured to said table in the path of movement of the bell crank lever to be engaged thereby to actuate the clutch to grip said rod, a second obstruction secured to said table in the path of movement of the bell crank lever to be engaged thereby to actuate the clutch to release said rod, and a spring for releasing said clutch from its engagement with said rod when the bell crank lever has been oscillated by the releasing obstruction.

In testimony whereof, I sign this specification in the presence of two witnesses.

HOWARD W. COTTON.

Witnesses:
THOS. S. CLARK,
JOS. M. CLARK.